Dec. 20, 1938. H. A. SOULIS 2,140,885
COMBINED HIGHWAY AND RAIL VEHICLE AXLE
Filed May 13, 1935 5 Sheets-Sheet 1
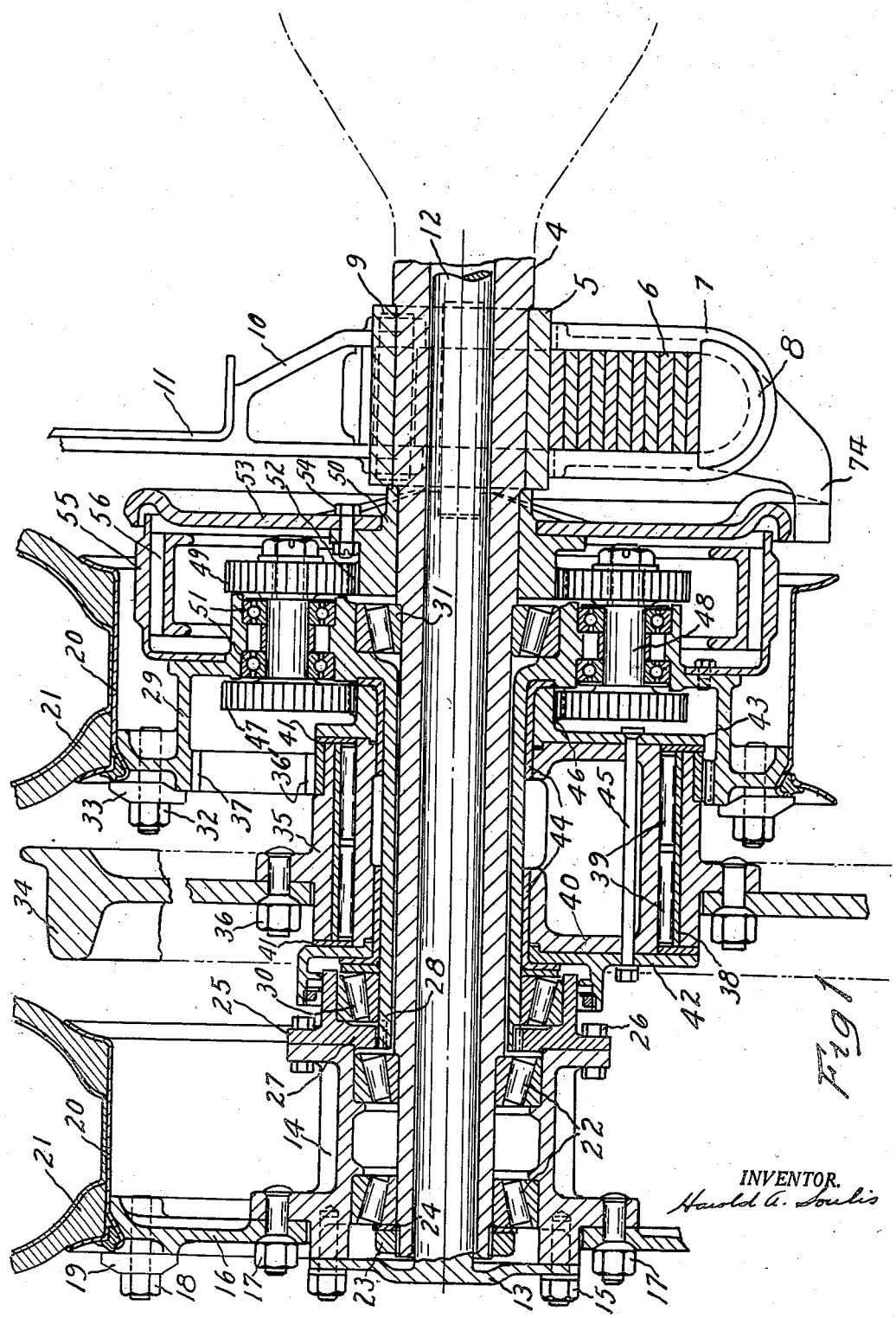
INVENTOR.
Harold A. Soulis

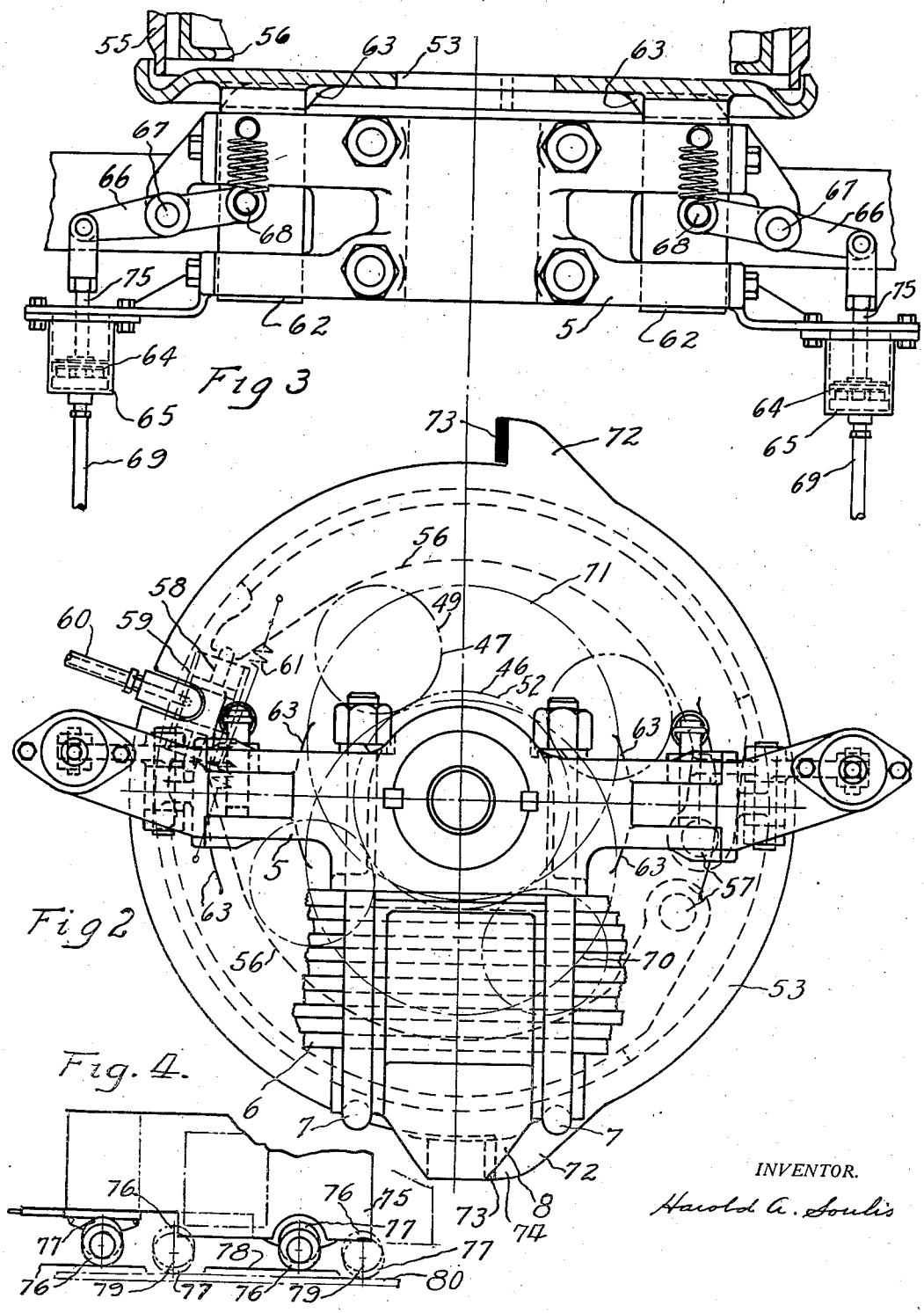

Dec. 20, 1938.   H. A. SOULIS   2,140,885
COMBINED HIGHWAY AND RAIL VEHICLE AXLE
Filed May 13, 1935   5 Sheets-Sheet 3
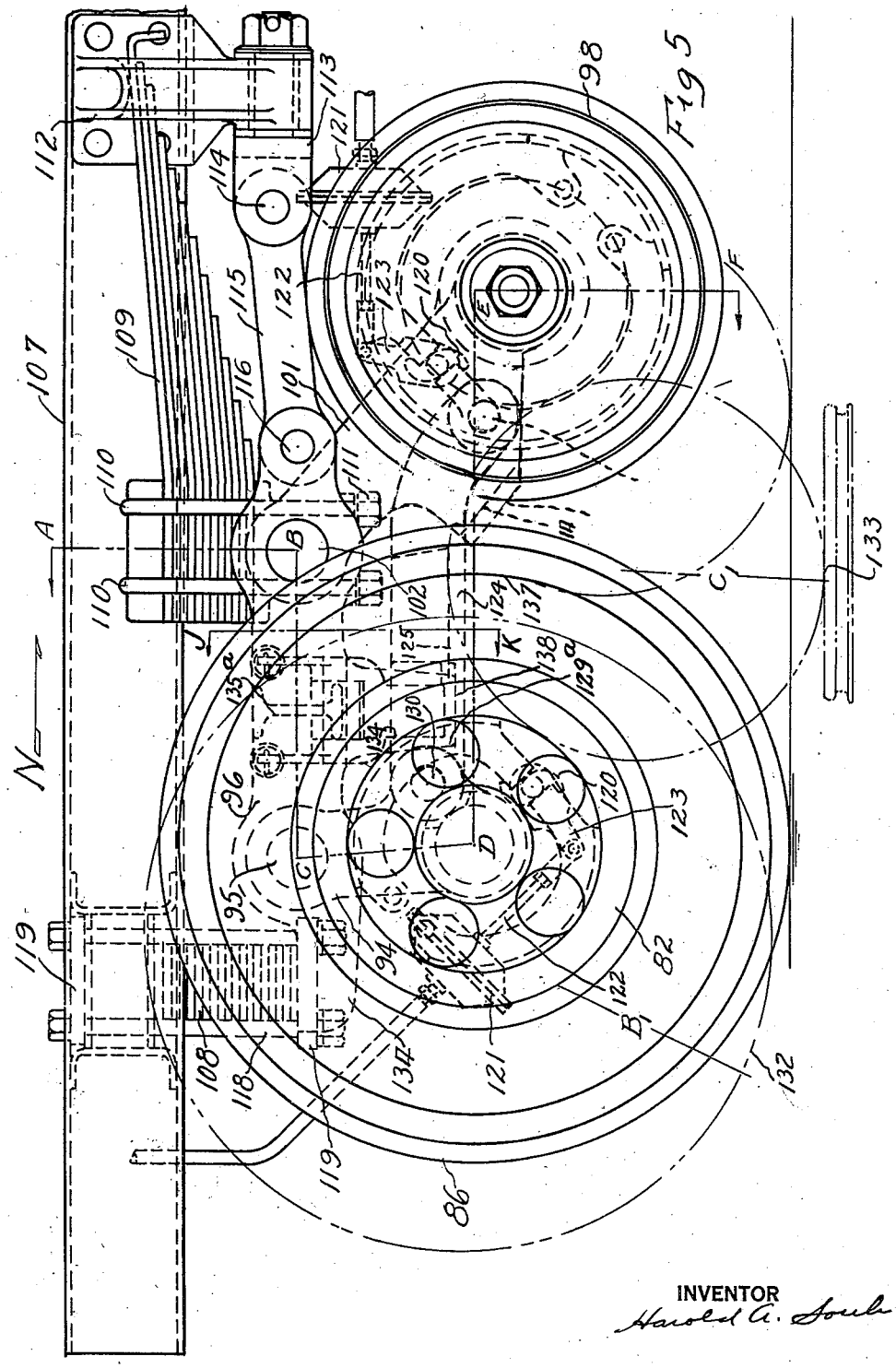
INVENTOR
Harold A. Soulis Dec. 20, 1938.   H. A. SOULIS   2,140,885
COMBINED HIGHWAY AND RAIL VEHICLE AXLE
Filed May 13, 1935   5 Sheets-Sheet 4
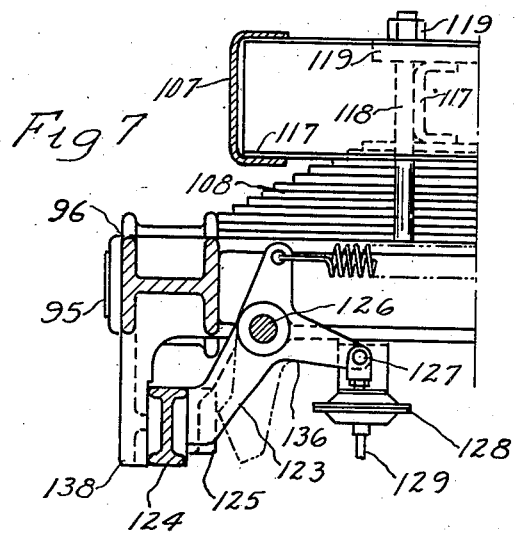
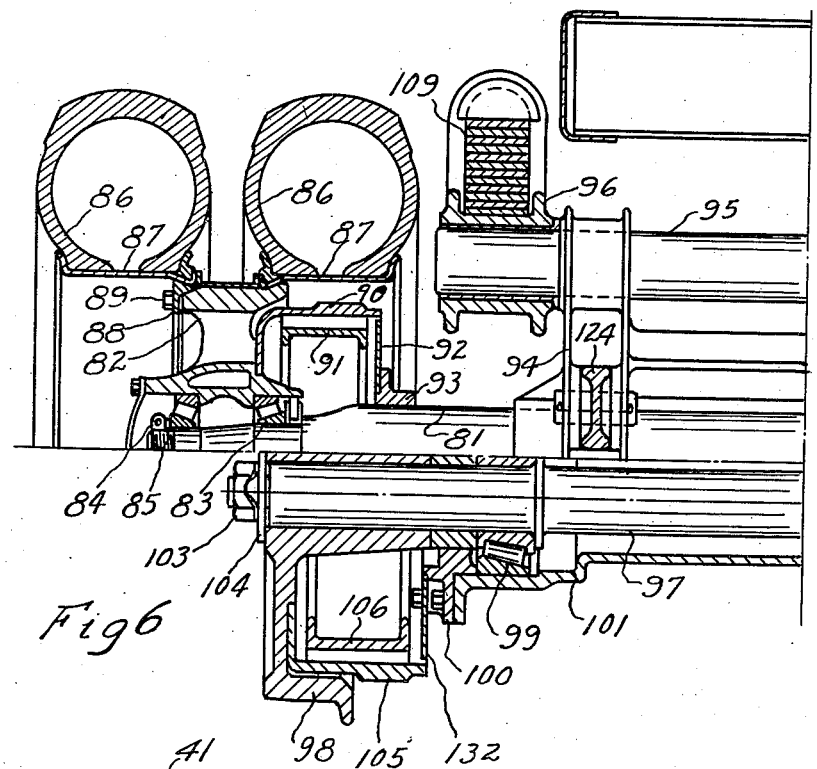
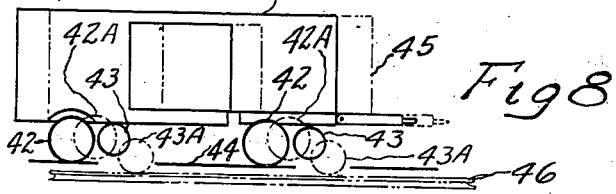
INVENTOR.
Harold A. Soulis

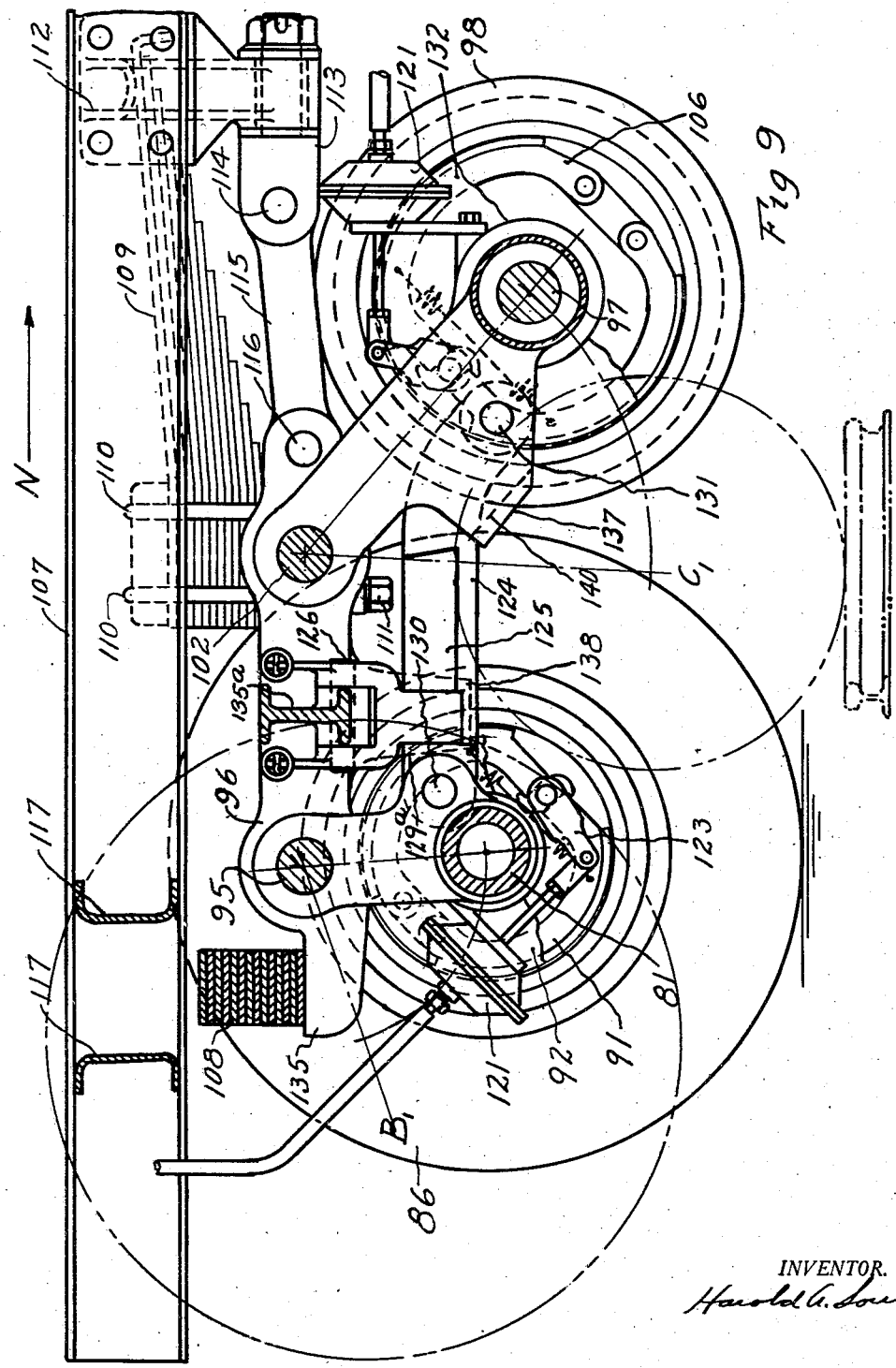

Patented Dec. 20, 1938

2,140,885

UNITED STATES PATENT OFFICE 2,140,885

COMBINED HIGHWAY AND RAIL VEHICLE AXLE

Harold A. Soulis, Easton, Pa.

Application May 13, 1935, Serial No. 21,128

13 Claims. (Cl. 105—215)

The primary object of the invention is to provide combined highway and rail vehicle axles in which the axle, or axles, are attached to a vehicle and carry sets of wheels for highway or railway track travel that may be selectively moved into service position. My combined highway and rail vehicle axle construction permits the vehicle upon which it is mounted to change from highway to rail or from rail to highway operation, without delay or the use of special equipment. The combined highway and rail vehicle axles when mounted on a vehicle, allow the vehicle to be removed from the rails of a railroad yard without expensive spotting or shifting of cars and will therefore greatly reduce the time and money required to deliver a shipment to the door of a consignee or from the door of a shipper to the rails of a railroad system. It will allow the greater speed of station to station operation of a railroad system over an all highway system, to be used to full advantage and at the same time remove heavy traffic from intercity highways. The combined highway and rail vehicle axles when mounted on a vehicle of the four wheel trailer type having steerable bogies at each end, may be removed or put on the rails from any direction, without any special equipment other than a tractor for motive power.

The vehicles upon which my combined highway and rail vehicle axles are mounted, are suitable for parcels or package traffic, as the vehicle body is suspended on suitable shock-absorbing axle mountings and does not require rigid packing requirements. A rail vehicle that can operate as a highway vehicle performs a better distribution service than a railroad. All of the benefits of both shipping systems can be incorporated in a vehicle of this type. No single problem is of such vital importance to the shipper of merchandise, to the tax payer and to the individual user of the highway, than the coordination of rail and highway transportation.

A still further object of the invention is to provide a vehicle of the foregoing character wherein the wheels used in rail operation are placed between the dual pneumatic tires used in highway operation, so as to allow the overall width of the tires when mounted on the combined highway and rail vehicle axle, to be within the legal limits of highway vehicles of the several States.

A still further object of the invention is to provide mechanism to allow the fixed section of a braking system to be mounted with a controlled radial movement with respect to the vehicle axle, so as to use the controlled radial action of the brake backing plate and the application of power to perform the work of moving the rail wheels or highway wheels into or out of service position, when the axle wheels are rotated, as is the case where the combined highway and rail vehicle axle is mounted on a vehicle and the vehicle is given motion.

A still further object of the invention is to provide mechanism to allow the rail or highway wheels to be moved into service position, by using a predetermined movement of the vehicle upon which the combined highway and rail vehicle axle is mounted. This is accomplished without the driver leaving his seat at the steering wheel of the vehicle, and is accomplished by control valves and lines operated from the driver's seat.

A still further object of the invention is to provide means to apply power for traction to either the rail or highway service wheels. This feature may be omitted, should the combined highway and rail vehicle axle be mounted on a vehicle not having its own power plant.

The preferred form of my invention comprises the provision of a combined highway and rail vehicle axle with dual purpose rolling means for operating over a highway or over the tracks of a railroad system, that can be attached to a container or to the chassis of a vehicle that can be commercially built and operated in the transportation of goods with a minimum loss of time in transit and at a considerable saving in handling costs.

Other objects and advantages from the utilization of my invention will doubtless present themselves as the description proceeds and I would have it clearly understood that I reserve unto myself all rights to the full range of equivalents, both in manner of practicing my invention and its use, to which I may be entitled under my invention in its broadest aspect. For the purpose of the present disclosure, I have elected to describe a certain preferred axle and its modification. However, as previously pointed out, this is not to be interpreted as a limitation of the scope of my invention, which may be followed with equal success in use in other forms.

In the drawings, where like numbers in the several views represent similar parts; Figure 1 is a sectional view showing one side of the combined highway and rail vehicle axle, the opposite side being similar, except that one side is made right hand and the other side left hand. The highway and rail service wheels are mounted on parts that allow the wheels to be raised or lowered for service on the rails or highway.

Figure 2 is an end view of Figure 1 showing in detail the locks for the semi-fixed section of the braking system to be unlocked or locked, so that the brake reactionary effort can transfer one or the other set of wheels to a service position as motion is given to the combined highway and rail vehicle axle when attached to a vehicle.

Figure 3 is a plan view partly in section of Figure 2 showing the means of operating the locks of the semi-fixed section of the braking system.

Figure 4 is a side elevational view of a form of vehicle equipped with the highway and track rail wheels.

Figure 5 is a side elevation of a combined highway and rail vehicle axle construction that has a separate axle for the highway wheels and a separate axle for the rail wheels.

Figure 6 is a sectional view of Figure 5 taken through A—B, —C—D, —E—F. The method of mounting the highway wheels and the rail wheels on the combined highway and rail vehicle axles is shown in the view.

Figure 7 is a sectional view taken through J—K of Figure 5. Both sides of the combined highway and rail vehicle axle construction shown are alike except that one side is right hand and the other side is left hand. The construction of the locking parts used to keep the combined highway and rail vehicle axles in a fixed position after the wheels have been changed from rail to highway or from highway to rail is shown in this view.

Figure 8 is a side elevational view of a form of vehicle equipped with the highway and the rail wheels shown in Figures 5, 6 and 7, and has the position of both the highway and the rail wheels shown. By the use of solid and dotted lines, the highway wheels are shown in service position and the rail wheels are shown in service position and as indicated the vehicle has moved its position when changing from rail wheels in service position to highway wheels in their service position. When the operation is reversed, that is, when the change is to be from highway wheels in their service position to rail wheels in their service position, the vehicle goes through a movement in the opposite direction far enough to swing the wheels through an arc sufficient to place the rail wheels in their service position.

Figure 9 is a side elevational view partly in section of the combined highway and rail vehicle axle construction that has a separate axle for highway wheels and a separate axle for rail wheels, showing the swinging brackets 94 and 101 and their connections from the inside of the wheels.

Referring to Figure 1 in the accompanying drawings, I have used the reference numeral 4 to indicate the axle with a keyed on spring seat 5, upon which spring 6 is held to the spring seat by clips 7 with a spring saddle 8 serving as a clamp between the clips 7 and the spring 6. Clips 7 are held in place on the spring seat 5 by nuts screwed on the ends of the clips. The front end of the springs 6 have eyes with pin 9 extending through and projecting into holes in bracket 10. The bracket 10 is fastened to the frame 11 of the vehicle. The rear end of the spring 6 is attached to the frame 11 by a pin and shackle and a bracket. These parts are well known in the art and are not shown.

Numeral 75 in Figure 4 represents the body of a vehicle with highway wheels shown at 76 and rail operating wheels indicated at 77. Highway wheels 76 are shown in service position on the highway 78. The rail operating wheels in their service position are shown at 79, resting on railroad track 80, after the vehicle and wheels have moved into the position shown dotted.

The axle 4 has a driving shaft 12 which is driven by the axle housing driving means, from a power unit and is well known in the art. At the outer end of driving shaft 12 is a flange 13 which is attached to the wheel hub 14 by means of studs and nuts 15. Wheel disc 16 is mounted on hub 14 by means of nuts and studs 17, and studs and nuts 18 are used to pull up clamp 19 against wheel rim 20. Wheel 20 carries the tires and tubes 21. Hub 14 is mounted on roller bearings 22 and roller bearings 22 are mounted on axle 4. The outer roller bearing 22 is held in place by nut 23 and washer 24. At the inner end of the hub 14, hub extension 25 is attached by bolts 26. Hub extension 25 has a serrated inset flange 27 which meshes with serrations on inner wheel spindle 28 to act as a flexible connection between the inner wheel 29 and the outer wheel hub 14. Should it be desired to use the axle as a live axle as shown in Figure 1, the driving torque transmitted to the outer hub 14 will be transmitted to the inner wheel 29, so as to drive the vehicle when the pneumatic tires 21 are in a service position, or to drive rail wheels 34 when in service position, as will be shown. Hub extension 25 carries roller bearing 30 which supports the inner wheel spindle 28 in proper axial position. The inner end of inner wheel spindle 28 is integrally attached to inner wheel 29 and is held in axial position by bearing 31. The inner wheel rim 20 and tire 21 are held on the inner wheel 29 by bolts and nuts 32 and clamp 33.

The rail wheel 34 is attached to wheel hub 35 by nuts and studs 36. The inner end of wheel hub 35 is fitted with a ring gear 36' which meshes with an internal gear 37 on inner wheel 29 which transmits torque to the rail wheels and will propel the vehicle should the rail wheels 34 be in service position. Rail wheel hub 35 has a sleeve 38 in which roller bearings 39 allow the hub to turn on eccentric sleeve 40. Parts 41 are thrust washers. Eccentric sleeve 40 has end plates 42 and 43 which are fitted over bearings 44. Plates 42 and 43 are held in position against eccentric sleeve 40 by bolts 45. Bushings 44 allow the eccentric assembly to turn on inner wheel spindle 28. The inner plate 43 has a gear cut at 46, and meshes with spur gears 47. Gears 47 are attached to shafts 48 which have gears 49 fixed to them. Gears 49 mesh with gear 52 on brake backing plate adapter 50. Gear 52 has the same pitch diameter as gear 46 and gears 47 and 49 have the same pitch diameter. The shaft 48 is mounted on ball bearings 51 in inner wheel 29. Backing plate adapter 50 is free to turn on axle 4 and carries backing plate 53 attached to it by bolts and nuts 54. Brake drum 55 is attached to inner wheel 29 and therefore rotates with the wheel 29.

Brake shoes 56 are attached to brake backing plate 53 so as to fulcrum as shown at 57 in Figure 2. Brake shoes 56 are forced against brake drum 55 by pistons 58 which are forced out by the pressure of the liquid in the cylinder 59 being raised by a central power cylinder connected to the cylinder 59 by flexible hose 60. Retracting spring 61 pulls the brake shoes 56 away from the brake drum 55, when the pressure is released from the liquid in cylinder 59 by the operator of the vehicle upon which the axle is mounted. Locking bars 62 are held between bosses 63 that are integral with the brake backing plate 53. The backing plate 53 and backing plate adapter 50 cannot rotate when the shoes 56 are forced against the brake drum 55 and the locking bars are between bosses 63. Therefore the vehicle upon which the axle has been mounted, will be brought to rest, when the brakes are applied. Locking bars 62 are slidably fixed to the integral extensions of the spring seat 5, so as to move toward and away from projections 63 of backing plate 53. Spring seat 5 is fixed to spring 6 and therefore cannot rotate with said backing plate 53.

To raise rail operating wheels 34 to a position to allow highway operating tires 21 to contact the roadway, locking bars 62 shown in Figure 3, are moved from between backing plate bosses 63 by means of the piston 64 being forced along the cylinder 65. The piston has a connection at 75 with the lever 66 which has a fulcrum at 67 and is connected at its opposite end through pin 68 to locking bar 62. Fluid under pressure exerts pressure on the piston 64 by means of a hose connection 69 between the cylinder 65 and a central power cylinder, which is well known in the art. The control of the pressure on the liquid or fluid is at the control of the operator by valves located in the operator's cab. Backing plate 53 is revolved about the axle 4 when the brake shoes 56 are forced against the brake drums 55. As the vehicle moves and the tires 21 or the rail wheels 34 revolve by reason of the moving vehicle, and by reason of the gears 49 and 47 being in mesh with gears 52 and 46, plate 43 will revolve causing eccentric sleeve 40 to revolve from position 70 shown in Figure 2 to position 71. This operation will raise rail operating wheels 34 to allow tires 21 to be placed in a service position. To place the rail operating wheels in a service position, a reverse operation takes place. The locking bars 62 are returned to a position between the bosses 63 on backing plate 53 after the rail operating wheels have been raised or lowered, as the case may require. To prevent an over motion of the eccentric sleeve 40, when raising or lowering the rail operating wheels 34, backing plate stops 72 having rubber blocks 73, strike the spring saddle stop bracket at 74, after the eccentric sleeve has been turned through the proper arc.

Inner wheel tire 21 is removed or put on inner wheel 29 by removing the nuts from the nut and bolt assembly 17 and removing wheel disc 16. Rail wheel 34 is removed from wheel hub 35 by removing the nuts from nut and bolt assembly 36 and removing the rail wheel 34. Removal of the nuts from nut and stud assembly 32 and removal of clamps 33 allow inner wheel to tire 21 and rim 20 to be removed. To put the tire 21 and rim 20 back on the inner wheel 29, a reverse operation takes place.

Referring to Figures 5 and 6 in the accompanying drawings, I have used the reference numeral 81 to indicate the axle used to carry the highway wheels 82. Highway wheels 82 turn on bearings 83 which are held endwise on axle 81 by nut 84 and washer 85. The tires and tubes 86 used in highway operation are held by rims 87 which are clamped on wheel 82 by rim clamps 88 and bolt 89. Attached to wheel 82 is brake drum 90. Brake shoes 91 are pivotally attached to brake backing plate 92 and are secured to axle 81 through brake adapter 93. Axle 81 is secured to a swinging bracket 94 which, in turn, is secured to cross shaft 95. Cross shaft 95 is free to turn in a bearing hole in beam 96.

Referring to Figures 5 and 6 in the accompanying drawings, I have used reference numerals 97 to indicate the axle used to carry the rail wheels. Axle 97 turns on bearings 99 which are held from endwise motion by brake backing plate adapter 100. Brake backing plate adapter 100 is secured to swinging bracket 101, which in turn is secured to cross shaft 102 which is free to turn in a bearing hole in beam 96. Rail wheel 98 is secured to axle 97 by being forced against the inner race of bearing 99 when nut 103 is screwed against washer 104. Rail wheel 98 has brake drum 105 attached to it. Brake shoes 106 have pivotal connection to brake backing plate 132 which is screwed to brake backing plate adapter 100 to prevent the brake backing plate turning.

In Figures 5 and 6, beam 96 has resilient connection to the vehicle frame 107 by springs 108 and 109. Springs 109 are attached to beams 96 by spring clips 110 which are pulled up by nuts 111 to securely clamp the spring 109 to beam 96. The free ends of springs 109 have brackets 112 slidably supported on their free ends. These brackets 112 are fastened to the vehicle frame 107 to partially support the load. The lower ends of brackets 112 pivotally hold clevis bolt 113. Clevis bolt 113 has a connection through pin 114 to link 115 which is connected to beam 96 through pin 116. The rear end of beam 96 has a resilient connection to frame 107 by ledges shown at 135 integral with beam 96, supporting the free ends of spring 108. Spring 108 is secured to the frame cross member 117 by bolts 118 and nuts 119. The plates 119 serve as pressure plates to transfer the pull of bolts 118 to clamp the spring 108 securely to the frame members.

Referring to Figures 5 and 6 the highway wheels 82 and tires 86 are shown in service position. To place the rail wheels 98 in service position, brake shoes 91 are forced against brake drum 90 and brake shoes 106 are forced against brake drum 105 by cams 120 being revolved by the force exerted by air diaphragms 121. These diaphragms are well known in the art and are energized by air under pressure. Rod 122 transfers the motion of the diaphragm 121, when under air pressure, to lever 123 which is connected to a shaft integral with the cams 120. The wheels are now held from rotation by the brakes and the lever lock 123 is disengaged from the lug 125 on beam tie bar 124 and boss 134 on the swinging bracket 94. Lever lock 123 has a fulcrum pin 126, held in position by bosses on the tie bar cross member 135a of beam 96. The lock extension 136 is connected through pin 127 to air power diaphragm 128 when air under pressure is allowed to flow through tube 129. The dotted position shows the lock 123 disengaged from beam tie bar lug 125 and swinging bracket boss 134. The beam tie bar 124 is connected at one end to swinging bracket 94 by pin 130, the opposite end of the tie bar 124 is connected to swinging bracket 101 by pin 131. To transfer the rail wheels 98 to service position, motion is given the vehicle in a direction indicated by arrow N and the highway wheels 82 being held against free rotation and the lock 123 being disengaged, the swinging bracket 94 and swinging bracket 101 will fulcrum about cross shaft 95 and cross shaft 102 respectively. Beam tie bar 124 pulls swinging bracket 101 through an arc sufficient for wheels 98 to contact the rails of a railroad system at which time the swinging motion will be continued by the resistance to rotation of rail wheels 98 and the swinging arm 94 will continue motion until point B is reached and the swinging arm 101 will continue until the position C is reached. The highway wheels are off of service position as shown at 132. The lock 123 is allowed to return between lug 125 of tie bar 124 and boss 137 on swinging arm 101. Extension 138 on beam 96 shown in Figures 5 and 7 acts as a stop to prevent an over motion of swinging brackets 94 and 101 by striking projection 129a on swinging bracket 94 when the highway wheels are moved into service position and will strike projection 149 on swinging bracket 101 when the rail wheels are moved into service position. Extension 138 also locates the position of the swinging brackets 94 and 101 and beam tie bar 124 so that lock 123 will fall between the locking parts when changing from one set of wheels to the other set. The axles are now ready for operation on a vehicle for rail service. To put the highway wheels 82 in position to operate on the highway, a reverse operation takes place. Referring to Figures 5, 6, 7 and 9, the operations of the swinging brackets 94 and 101 are shown with their connections. The reference numerals in Figures 5, 6, 7 and 9 designate like parts. The functions of the swinging brackets 94 and 101 are to alternately and simultaneously transfer the rail wheels 98 and the highway wheels 82 and tires 86 into and out of service position, utilizing the motion of the vehicle upon which they are mounted and the retarding or stopping of the wheel rotation, by the application of the service brakes shown in Figures 6 and 7. Referring to Figures 5, 6, 7 and 9, the various parts used to transfer the wheels into and out of service position, are designated by numerals, the swinging brackets 94 and 101 being held concentric at one end to axles 81 and 97 respectively, while their other ends are free to rotate about cross shafts 95 and 102 respectively. Cross shafts 95 and 102 are held in position to each other by beams 96 while beams 96 are held to the frame of the vehicle as heretofore described. The swinging brackets 94 and 101 are held in angular relation to each other by beam tie bar 124, which is pivotally connected to swinging brackets 94 and 101, by pins 130 and 131 respectively. It is evident that with any angular motion of the swinging brackets 101 and rail wheel 98, a proportional angular motion is given to the swinging brackets 94 and wheels 82 with tires 86. This angular motion will raise or lower the wheels in proportion to the angular motion of the swinging brackets 94 and 101. To change rail wheels 98 to service position on the rails and to reverse highway wheels 82 and tires 86 from service position, compressed air is admitted through tube 129 to air power diaphragms 128 to unlock or remove the locking end of lever lock 123. The air, upon being admitted to air power cylinder 128, forces against the pin 127, which being fixed in a hole in an extension of lock 123, will partially turn the lock against spring pressure, around fulcrum pin 126. Fulcrum pin 126 is fixed in an extension of beam 96. The lock rotates to the dotted position shown in Figure 7, so that it clears the lug 125 of the beam tie bar. The brakes shown in Figures 5 and 6 are now applied by the admission of compressed air to the air power cylinders 121, which forces rod 122 away from the air power cylinders 121 to partially rotate the slack adjusters 123 on the end of a shaft connection to brake cams 120. The partial rotation of cams 120 will force the shoes 91 and 106 against brake drums 90 and 105 respectively. These brake drums 90 and 105 are fixed to wheels 82 and 98 respectively, so that a retarding or stopping force is exerted on these wheels against rotation. With these operations completed, motion is given to the vehicle, upon which the axles are mounted, in the direction of the arrow shown at N. The highway tire 86 being in contact with the highway, this retarding force exerted against the tire and wheel rotation, will set up a force tending to swing braket 94 around cross shaft 95. Swinging bracket 94 being connected to swinging bracket 101, will be rotated by this retarding force of the tires on the highway, until swinging bracket 101 has traveled through an arc sufficient to place the rail wheels 98 in contact with the rails, at which time the retarding force exerted by the brake on rail wheels 98 will tend to continue the rotation of swinging brackets 101 and 94 until the extension 138 on beam 96 shown in Figures 5, 7 and 9 acts to stop the angular travel of the swinging brackets 94 and 101, by the fact that extension 138 will strike against the projection 140 on swinging bracket 101 when the rail wheels have reached their service position, shown at C' and highway wheels have reached the position B'. Extension 138 also locates the angular position of swinging brackets 94 and 101 and beam tie bar 124 so that lock 123 will fall between the lug 125 on beam tie bar and extension 137 on swinging bracket 101, when the air is released from the air power diaphragms 128. The air being released from the wheel brakes, the vehicle can be moved with the rail wheels securely locked in place. To reverse the operation, or to swing the highway wheels and tires in a service position and swing the railroad wheels out of service position, air is admitted through tube 129 to air power diaphragms 128 to remove the locking end of lock 123. The air upon being admitted to the air power cylinder 128, forces against the pin 129, and being fixed in a hole in an extension of lock 123 will partially turn the lever lock, against spring pressure, around fulcrum pin 126. Fulcrum pin 126 is fixed in an extension of beam 96. The lock rotates to the dotted position shown in Figure 7 and clears the lug 125 of the beam tie bar. The brakes shown in Figures 5 and 6 are now applied by the admission of compressed air to the air power cylinders 121, which forces rod 122 away from the air power cylinders 121 to partially rotate slack adjusters 123 on the end of a shaft connection to brake cams 120. The partial rotation of cams 120 will force the shoes 91 and 106 against the brake drums 90 and 105 respectively. These brake drums 90 and 105 are fixed to wheels 82 and 98 respectively, so that a retarding or stopping force is exerted on these wheels against rotation. With these operations completed, motion is given the vehicle upon which the axles are mounted, in the opposite direction of the arrow shown at N. The rail wheels 98 being in contact with the rails of a railroad system, the retarding force exerted against the rail wheels, against rotation, will set up a force tending to swing swinging bracket 101 around cross shaft 102. Swinging bracket 101 being tied to swinging bracket 94, will be rotated by this retarding force of the rail wheels on the rails, until swinging brackets 94 have traveled through an arc sufficient to place the highway tires 86 in contact with the highway, at which time the retarding force exerted by the brake on the highway and tires 86, will tend to continue the rotation of swinging brackets 94 and 101, until the extension 138 on beam 96 shown in Figures 5, 7, and 9 acts to stop the angular travel of the swinging brackets 94 and 101, by the fact that extension 138 will strike against a projection 129 on swinging bracket 94, at which time the highway wheels and tires have reached their service position. Extension 138 also locates the angular position of swinging brackets 94 and 101 and beam tie bar 124 so that lock 123 will fall between the lug 125 on the beam tie bar and extension 129 on swinging bracket 94 when the air is released from the air power diaphragms 128. The air being released from the wheel brakes, the vehicle can be moved with the highway wheels securely locked in place.

Numeral 41 in Figure 8 represents the body of a vehicle upon which the axle construction shown in Figures 5, 6, 7 and 8 has been mounted. The full lines indicate the vehicle with the highway wheels 42 in service position on highway 44 and the rail wheels 43 are shown above the road elevation in an inoperative position. Numeral 45 indicates the approximate position, when the vehicle has moved so as to place the rail wheels 43 in the dotted service position as shown at 43—A and the highway wheels 42 have moved to the inoperative position as shown at 42—A. Rail wheels shown at 43—A rest on the rails 46 of a railroad system. After the wheels have been changed from one type to another type, the wheels are securely locked in position until such time as another change in wheels is necessary.

The operation of my invention will be readily understood from the foregoing description. The raising or lowering of the wheels is due to a predetermined motion of the vehicle. The use of the reaction forces in the braking system is utilized, with the motion of the vehicle to change the type of wheels from highway to rail wheels or from rail wheels to highway wheels in their service position, so as to be efficiently operated on a highway or on the rails of a railroad system, without any loss of time at the rail heads. I do not intend to be limited to the specific modes of embodying the invention which I have shown, since as will be evident, there may be two or more forms thereof without departing from the spirit of the same.

I believe I am the first to provide broadly, a combined highway and rail vehicle axle or axles that has means to place the rail wheels between the dual pneumatic tires and to raise the rail service wheels by means of the reaction forces in a braking system, in combination with a forward or backward motion of the vehicle upon which they are mounted.

I do not intend to be limited to the details shown or described.

I claim:

1. In a vehicle axle, comprising an axle and dual highway operating wheels having a hub and flanged rail operating wheels, one of said flanged rail operating wheels being mounted on an eccentric sleeve having a bearing on said dual highway operating wheel hub between the inner and outer wheels of said dual highway operating wheels, said flanged rail operating wheels having a gear integrally attached, said highway operating wheels having a gear integrally attached that meshes with said flanged rail operating wheel gear, a brake drum associated with said wheels, brake shoes located within said drum, a brake backing plate, said eccentric sleeve having connection to said brake backing plate, the brake backing plate having a free bearing on said axle and being releasable to rotate when and only when the said wheels are to be shifted, the brake shoes having a pivotal connection therewith, means to turn the said eccentric sleeve through an arc sufficient to raise said rail operating flanged wheels and lower said dual highway operating wheels, or to lower said rail operating flanged wheels and raise said dual highway operating wheels, when said brake shoes are forced against the said brake drum and torque is applied to said highway operating wheels.

2. In combination, an axle, dual wheels for highway operation and wheels for rail operation, mounted at each end of said axle, a braking system having brake shoes mounted on a backing plate, said backing plate being normally fixed against rotation, an eccentric mounting for said rail wheels and means to apply said braking system to turn said eccentric mounting through an arc sufficient to raise or lower said rail operating wheels so that the rail wheels may be lowered and the highway wheels raised or the rail wheels may be raised and the highway wheels lowered, to a service position, when the said rail wheels or said highway wheels are rotated, said backing plate being capable of a limited arcuate movement, when the braking system is effective in the shift from one set of wheels to the other.

3. In a vehicle comprising a body and axles, mountings to attach said axles to said body, wheels for rail operation and wheels for highway operation mounted on said axles, a braking system effective in retarding and stopping the movement of said vehicle including brake shoes and a backing plate carrying said shoes, and means associated with the components of said braking system to use controlled arcuate movement of said backing plate and the application of power to said braking system, to raise the wheels for rail operation and lower the wheels for highway operation or to lower the wheels for rail operation and raise the wheels for highway operation, when a predetermined motion is given the vehicle, opposition to braking effort effective upon the wheels then supporting the vehicle.

4. In a vehicle comprising a body and axles, mountings to attach said axles to said body, wheels for rail operation and wheels for highway operation mounted on said axles, braking systems mounted on said axles and said wheels for rail operation and said wheels for highway operation, means to apply power to said braking systems to set up a resistance to turning of said wheels for rail operation and said wheels for highway operation on said axles, and means to raise said wheels for rail operation and lower said wheels for highway operation or to lower said wheels for rail operation and raise said wheels for highway operation, when a predetermined movement is given to said vehicle while said power is applied to said braking systems and the vehicle is given motion.

5. A vehicle having dual wheels for operating upon the highway, flanged wheels for traversing railroad trackage, a braking system including brake drums associated with certain of said highway wheels and with said flanged wheels, backing plates in juxtaposition to said drums and brake shoes mounted thereon for movement into and out of engagement with said drums, said backing plates being immovable relatively to the vehicle in the normal functioning of the braking system to decelerate and arrest the movement of the vehicle on the highway or on railroad trackage, mechanism to render said backing plates movable with the wheels and means for transferring the load from one type of wheels to the other when the brakes are applied to the supporting wheels and the backing plates are movable therewith, said means being operative in response to the movement of the vehicle on the then supporting wheels in opposition to the braking effort effective thereupon.

6. A vehicle having dual wheels for operating upon the highway and flanged wheels for running upon railroad trackage, a single braking system for decelerating and arresting the movement of said vehicle when operating upon the highway or upon the railroad trackage, said system including brake drums associated with certain of said highway wheels and with said flanged wheels, brake shoes effective upon said drums, said shoes normally being nonrotatable relatively to said vehicle, mechanism to render said brake shoes capable of limited movement with said drum when engaged therewith and means for transferring the load from the wheels of one type to the wheels of the other type when the shoes are engaged with the drums of the then supporting wheels, said latter means being operative solely in response to the simultaneous application of motive power and braking effort to the supporting wheels.

7. A vehicle having dual wheels for operating upon the highway and flanged wheels for running upon railroad trackage, a service braking system for decelerating and arresting the movement of said vehicle when operating upon either type of wheels, said system including brake drums associated with certain of said highway wheels and with said flanged wheels, brake shoes normally effective upon said drums to slow or stop the movement of the wheels with which they are associated, mechanism for transferring the load from the then supporting wheels to the wheels of the unlike type in response to tractive effort transmitted to the then supporting wheels when the brake shoes are effective upon the drums thereof to arrest rotative movement of such wheels, including means then permitting the brake shoes engaged with the brake drums of both types of wheels to move with such wheels.

8. A vehicle having dual wheels for highway operation and flanged wheels for traversing railroad trackage, a service braking system including brake drums associated with certain of said dual wheels and said flanged wheels, brake shoes simultaneously effective upon the wheels of both types to decelerate and arrest the movement of the vehicle in normal operation upon the highway or railroad trackage, means for transferring the load from the then supporting wheels to the wheels of unlike type in response to tractive effort transmitted to the then supporting wheels when the brake shoes are effective upon the drums thereof to render them non-rotatable with respect to said shoes, including means then permitting the brake shoes engaged with the supporting wheels and with the non-supporting wheels to move with such wheels in the transfer of such wheels from one of their two positions to the other.

9. A vehicle having dual wheels for highway operation and flanged wheels for traversing railroad trackage, a service braking system including brake drums associated with certain of said dual wheels and said flanged wheels, brake shoes for engaging the drums of the supporting wheels to decelerate and arrest movement of the vehicle when operating upon the highway or along the rails, means interconnecting the unlike types of wheels, mechanism for actuating said means to raise one type of wheels and simultaneously place the other type of wheels in load supporting position, as may be preselected, and means for conditioning said mechanism to function only in response to the application of tractive effort to the supporting wheels, when the brakes are applied thereto.

10. A motor-vehicle having pneumatically tired dual wheels for highway operation and a wheel located between such dual wheels flanged for traversing the rails of a railroad, and means for transferring the load from said highway wheels to said flanged wheel and vice versa, as may be preselected, said means including the vehicle braking system and mechanism for raising and lowering said flanged wheels, said latter mechanism being operable only in response to power applied to the movement of the vehicle, when the braking system is functioned to prevent rotative movement of the then supporting wheels.

11. A vehicle convertible for operation upon the highway or upon railroad trackage, having dual wheels, equipped for highway operation and a flanged rail wheel located therebetween, a braking system for decelerating and arresting the movement of the vehicle when operating upon the highway or upon the railroad trackage, a mounting for said flanged wheel and mechanism for actuating said mounting relatively to said dual wheels to project said flange wheel to a rail-engaging position, below said dual wheels or to raise said flanged wheel to a non-functioning position above the roadway contacting surface of the dual wheels, as may be preselected, in response to tractive effort delivered to the supporting wheels only when said braking system is effective upon such supporting wheels to arrest rotative movement thereof.

12. A vehicle having dual wheels for operating upon the highway and flanged wheels for running upon railroad trackage, the flanged wheels being located between the dual wheels, a service braking system effective when operating upon either set of wheels, said system including brake drums associated with certain of said highway wheels and with said flanged wheels, brake shoes normally effective upon said drums to slow or stop the movement of the wheels with which they are associated, mechanism for transferring the load from the then supporting wheels to the wheels of unlike type in response to tractive effort transmitted to the then supporting wheels when the brake shoes are effective upon the drums thereof to arrest rotative movement of such wheels, including means then permitting the brake shoes engaged with the brake drums of both types of wheels to move with such wheels.

13. A vehicle adapted for operation upon the highway or the rails of a railroad, having highway wheels and flanged wheels for traveling upon the railroad trackage, certain of said latter wheels being located between associated laterally spaced highway wheels, means for rendering said wheels non-rotatable operable at will, rotative means associated with the flanged wheels for actuating them to a rail-engaging load-supporting position, below the peripheries of the highway wheels, said latter means being reversely operable to locate the flanged wheels above the peripheries of the highway wheels, to permit the latter to assume the load for road operation, and means for conditioning said rotative means for functioning, the operation of said rotative means being effective only when said wheels are rendered non-rotatable.

HAROLD A. SOULIS.